US008081367B2

(12) United States Patent
Bornhorst

(10) Patent No.: US 8,081,367 B2
(45) Date of Patent: Dec. 20, 2011

(54) LAYERED DIMMER SYSTEM

(75) Inventor: James Bornhorst, De Soto, TX (US)

(73) Assignee: Production Resource Group, LLC, New Windsor, NY (US)

( * ) Notice: Subject to any disclaimer, the term of this patent is extended or adjusted under 35 U.S.C. 154(b) by 703 days.

(21) Appl. No.: 12/145,003

(22) Filed: Jun. 24, 2008

(65) Prior Publication Data

US 2009/0316416 A1 Dec. 24, 2009

(51) Int. Cl.
*G02B 26/02* (2006.01)

(52) U.S. Cl. ........................................................ 359/227

(58) Field of Classification Search .................. 359/227
See application file for complete search history.

(56) References Cited

U.S. PATENT DOCUMENTS 5,963,283 A * 10/1999 Omae et al. ..................... 349/86

* cited by examiner

*Primary Examiner* — Euncha Cherry
(74) *Attorney, Agent, or Firm* — Law Office of Scott C. Harris, Inc.

(57) ABSTRACT

A dimmer wheel which is formed to absorb large amounts of light and to disperse the light that is absorbed. The dimmer wheel has a bottom surface that is irregular, and a reflective material in that bottom surface to scatter the light. A light absorbing material also receives some of the light.

13 Claims, 2 Drawing Sheets

LAYERED DIMMER SYSTEM

BACKGROUND

Stage lighting systems typically use an array of structures arranged along an optical axis to effect the characteristics of the light along that optical axis.

Our copending application Ser. No. 11/687,579 describes the use and functions of a relay lens in such a stage lighting device.

SUMMARY

The present application describes a special dimmer for use in a stage lighting device and describes formation of that dimmer.

DETAILED DESCRIPTION

Figure 1:
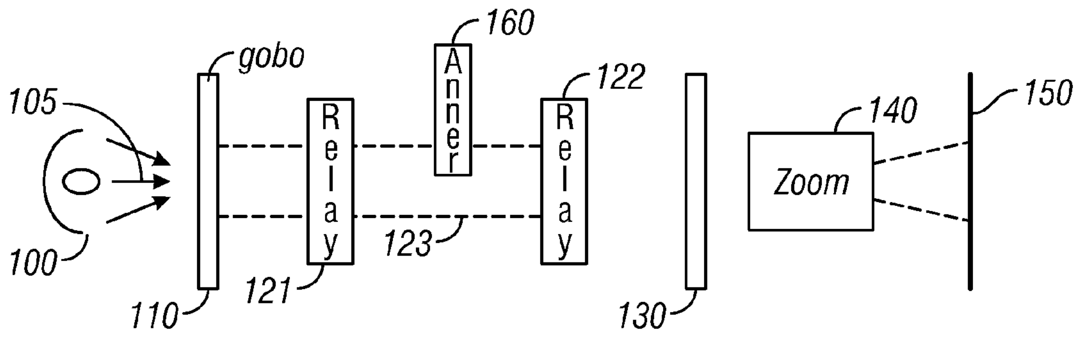
FIG. 1 shows an optical train of an embodiment.

FIG. 1 shows an embodiment as used in an optical system of the type described in our copending application Ser. No. 11/687,579, the entire disclosure of which is herewith incorporated by reference. A lighting device 100 produces light along an optical path shown as 105. A number of light altering elements are within the optical path. A first gobo 110 can shape the light or otherwise create effects within the light beam. The gobo can be etched metal or dichroic, for example. In the embodiment, for example, the gobo may be a dichroic or half-tone gobo of a specified pattern.

A relay lens assembly 120 is formed of a first relay lens part 121 and a second relay lens part 122. A stop 123 is defined between the first and second relay lens parts. Optical items that are placed into the stop 123 are integrated by the action of the relay lens. A second gobo 130 is located optically downstream of the relay lens. When the first gobo 110 and second gobo 130 are placed precisely in the same focus position, certain effects may be obtained.

A zoom lens assembly 140 receives the light that has been altered in this way, and projects it towards a target, for example a stage shown as 150.

Different items placed in the stop effect the light that passes through the system. A dimmer, for example 160, may be placed into the stop 123. The dimmer may be partially or completely inserted into the stop 123. The amount of dimming effect may depend, for example, on the amount by which the dimmer is inserted into the stop 123.

However, the inventor noticed that if the dimmer is metal or absorptive, it absorbs the energy in the optical stop, and this energy may significantly heat the material of the dimmer. This may cause the dimmer to get hot enough to cause problems with the dimmer. For example, when the dimmer gets too hot, it may crack some of the glass, or cause other heat related effects.

A dark mirror, if used, for example, could burn up from the heat.

The inventor realized that a dimmer than is reflective and neither specular nor diffuse could be used for such a system. An embodiment of such a dimmer is shown in FIG. 2.

Figure 2:
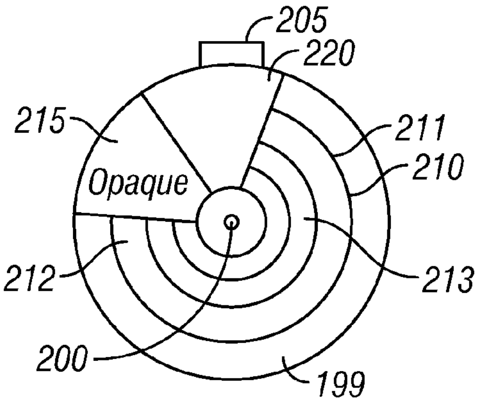
FIG. 2 shows a rotatable dimmer wheel.

FIG. 2 illustrates a dimmer wheel which is rotatable around a central axis 200 by a dimmer motor 205. The location of the dimmer motor sets the amount of the dimming effect. For example, the dimmer wheel 199 includes fingers 210 which are narrower at one location and gradually broaden towards another rotational location. The fingers are narrowest at the area 211, and are broadest at the area 212. Therefore, rotating the dimmer in a counterclockwise direction causes more of the area of the fingers to be placed in the light beam, and hence more of a dimming effect. The wheel may also have a completely opaque portion 215, and a completely clear portion 220, so that the dimming effect can be maximum when the portion 215 is in the stop, and can be minimized when the portion 220 as in the stop.

In an embodiment, the wheel is formed from etched glass. Each of the fingers such as 210, 213 are formed of etched glass with an irregular surface. The irregular surface is filled with a material (e.g., the aluminum/dark mirror sandwich as described herein) that disperses the incoming light rather than absorbing or fully reflecting it.

Figure 3:
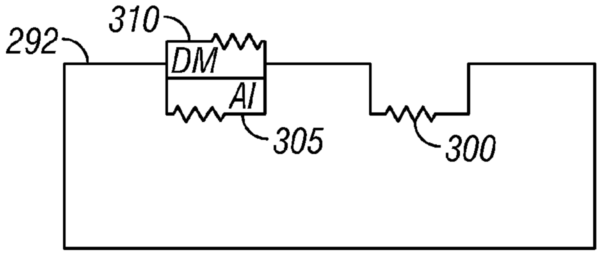
FIG. 3 shows a cross section of etched glass.

FIG. 3 illustrates a cross-section of the etched glass. Vias 300 are formed within the glass, and filled with an aluminum/dark mirror sandwich. Aluminum 305 is formed below the top surface of the glass 299 in the etched via. Dark mirror material 310 is formed above the surface of the glass. A weak etchant is used to flake the surface in a way that causes an irregular bottom portion instead of flat portions, can be used for this purpose.

Figure 4:
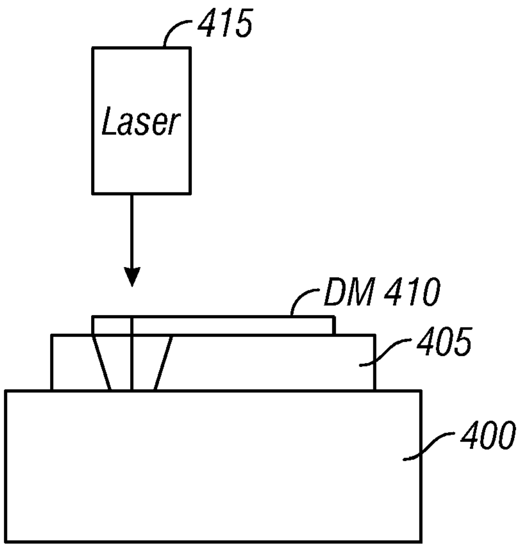
FIG. 4 shows a laser operation from the front.

The inventors noticed another problem illustrated with reference to FIG. 4. FIG. 4 shows a cross-section of a typical light absorbing part including glass 400, aluminum 405, and dark mirror material 410. Removing portions of this light absorbing part this might typically be done with a laser such as a UV laser shown as 415.

A problem, however, is that it may be difficult to remove a thin layer of the aluminum. This can chip the glass 400, and/or leave a hole in the glass substrate. In the embodiment, therefore, a laser is used from the backside of the device, that is, the uncoated side of the substrate.

Figure 5:
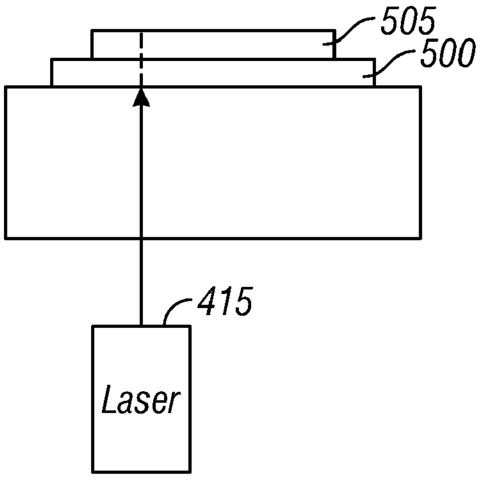
FIG. 5 shows a laser operation from the rear.

In an embodiment the laser 450 shown in FIG. 5 from the backside of the substrate, to remove a thin layer.

In an embodiment, a thin layer of reflective silicon 500 is used under the dark mirror material 505 in place of the aluminum. This thin layer of this embodiment is transparent to infrared, and therefore does not heat up as much as other materials.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other commands and command forms can be used.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. A dimmer system, comprising:
- a substrate;
- said substrate having openings therein defined by sidewalls and a bottom portion of said openings, wherein said bottom portion has an irregular surface therein; and
- a two-part optical filling within said openings, wherein said optical filling includes a first reflective portion, directly against said irregular surface, and a second heat absorbing portion, above said reflecting portion and directly connected thereto.

2. A dimmer system as in claim 1, wherein said heat absorbing portion is dark mirror material.

3. A dimmer system as in claim 1, wherein said reflecting portion is aluminum.

4. A dimmer system as in claim 2, wherein said reflecting portion is reflective silicon.

5. A dimmer system as in claim 1, wherein said reflecting portion is substantially transparent to infrared.

6. A dimmer system as in claim 1, wherein said substrate includes said openings arranged in a pattern which is irregular over a surface of said substrate.

7. A dimmer system as in claim 6, wherein said pattern is a substantially circular pattern with some of the openings defining wider areas than others of the openings.

8. A dimmer wheel comprising:
- a substantially disk shaped substrate;
- a plurality of fingers, located on said disk shaped substrate, said fingers forming a pattern that varies across a surface of the disk shaped substrate;
- wherein said fingers are formed with a first portion below an upper surface of the substrate, and a second portion above said upper surface of the substrate, including a bottom surface formed by an irregular surface;
- a filling material for said fingers, including at least a portion below the upper surface which comprises a reflective material with an irregular surface that mates with said irregular surface of said fingers, and a bottom surface that has an irregular surface, and wherein said fingers have different sizes at different areas on the substrate.

9. A wheel as in claim 8, wherein said reflective material is aluminum.

10. A wheel as in claim 8, wherein said reflective material is reflective silicon.

11. A wheel as in claim 8, wherein said fingers are light absorbing material.

12. A wheel as in claim 8, further comprising a portion of the wheel which is completely clear.

13. A wheel as in claim 8, further comprising a portion of the wheel which is completely opaque.

* * * * *